Wm Borden's
No. 121,078. Imp'd Tire Upsetter. Patented Nov. 21, 1871.
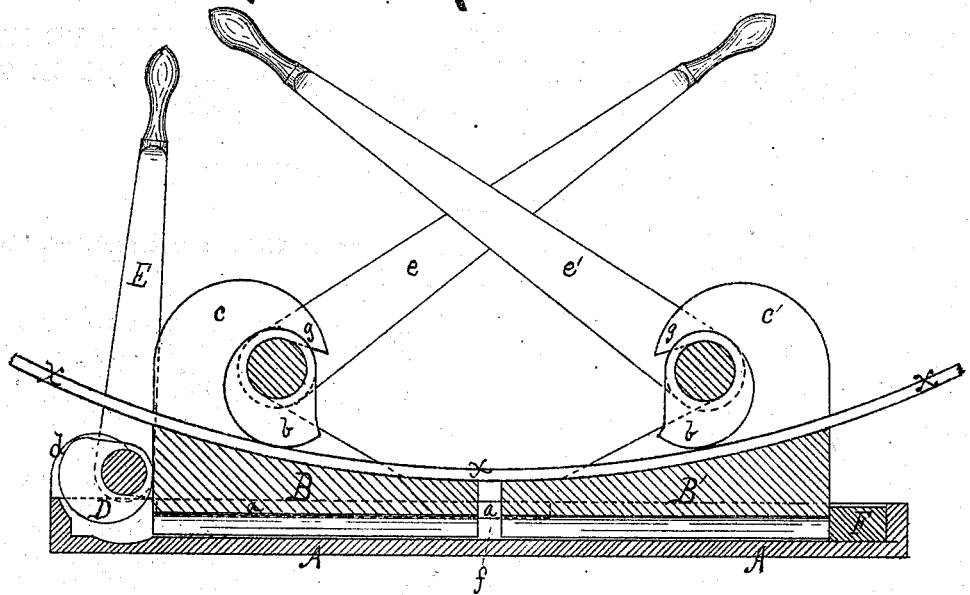
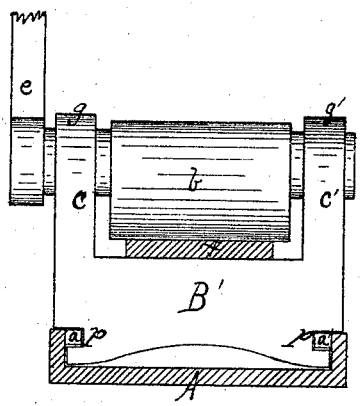

UNITED STATES PATENT OFFICE.

WILLIAM BOWDEN, OF WHITE'S CORNERS, ASSIGNOR TO RICHARD BOWDEN, OF HAMBURG, NEW YORK; SAID RICHARD BOWDEN ASSIGNOR OF ONE-HALF HIS RIGHT TO GEORGE ABBOTT, OF SAME PLACE.

IMPROVEMENT IN TIRE-MACHINES.

Specification forming part of Letters Patent No. 121,078, dated November 21, 1871; antedated September 7, 1871.

*To all whom it may concern:*

Be it known that I, WILLIAM BOWDEN, of White's Corners, in the county of Erie and State of New York, have invented certain new and useful Improvements in Tire-Upsetters, of which the following is a specification:

My invention is for the purpose of upsetting the tires of wheels, and is an improvement on my patent of August 30, 1870.

In the drawing, Figure 1 is a sectional side elevation. Fig. 2 is an end view.

A is the bed-plate, having inside lugs or ribs $a\ a'$ running about half its length. (See Fig. 2.) B B' are the two tire-holders or blocks setting in the bed-plate, and having grooves $p\ p'$, in which the lugs $a\ a'$ set. A space, $f$, is left between the two blocks, to be hereinafter explained, and a key-block, F, is set in one end of the bed-plate to prevent the block B from being taken out unless desired. The upper surfaces of the blocks B B' slant inwardly to conform to the curve of the tire X, and two upright jaws, $c\ c$, are formed on the outside of each block, the tire resting between them. The tops of these jaws bend inwardly a short distance, forming curved lugs $g\ g'$ to hold the removable cams $b\ b'$, which are forced down against the tire by lever-arms $e\ e'$. These are made removable, so that the circular tire can be taken in and out of the jaws. D is a similarly-shaped removable cam or eccentric, placed in similar lugs or hooked jaws $d\ d'$, secured to the back end of and forming part of the bed-plate A. (See Fig. 1.) This is moved by a lever-handle, E, similar to the others, which presses the cam D against the back of the block B, and closes the middle space $f$ between the two blocks before referred to, at the same time forcing the tire into itself, it having been previously heated at that point for the purpose.

The operation of the machine is as follows: The cam D in the end of the bed-plate is turned backward, presenting its narrowest surface to the back of the block B, which stands against it. The opposite block B is set back against the key-block F, leaving the space $f$ in the middle between the two blocks as wide as may be desired to shorten the tire. The tire, having been previously heated at its weakest or thinnest part, is now placed on the slanting or convex surfaces of the two blocks, (between their jaws $c\ c'$.) Then the eccentric cams $b\ b'$ are set in their receptacles or lugs $g\ g'$, and by the levers forced down against the tire, holding it immovably in place. The lever-handle E of the back cam D is then worked, forcing the block B forward toward the opposite block, gradually closing up the center space $f$, and forcing into itself the heated iron until the desired amount of upsetting is accomplished. The levers are then reversed and the cams $b\ b'$ removed. The spaces between the jaws $c\ c'$ of the blocks B B' are made wide enough for any-sized tire.

A special feature of novelty is the embodiment of the two clamp-blocks B B' in the hollow bed-plate A, each independent and each having a free movement, whereby they may be adjusted in any desired position to meet the primary cam D, by blocking up, as shown at F. Where one clamp-block is fixed in place, as in other arrangements, the cam sometimes expends its force before the proper degree of upsetting is produced. The arrangement of the several cams D $b\ b'$, and their engagement with the open hook-sockets which form their bearing, are also of importance, as they are adapted to the before-described construction of the adjustable clamps and hollow bed-plate, and enable the blocks to be slipped up or moved back by opening the cams without removing the tire from place.

I am acquainted with a patent, No. 94,346, August 31, 1869, which shows two serrated cams and a serrated sliding frame operated by a cam-lever; but it is not arranged nor does it operate like mine.

What I claim as my invention is—

The arrangement of the hollow bed-plate A, movable clamp-blocks B B', following-block or blocks F, hook-heads $c\ c'$, and cams D $b\ b'$, the whole constructed as described, and operating conjointly in the manner and for the purpose specified.

In witness whereof I have hereunto signed my name in the presence of two subscribing witnesses.

WM. BOWDEN.

Witnesses:
ALBERT HAIGHT,
C. N. WOODWARD.

(60)